United States Patent
Mase et al.

(10) Patent No.: US 9,506,391 B2
(45) Date of Patent: Nov. 29, 2016

(54) HONEYCOMB STRUCTURE

(71) Applicant: NGK Insulators, Ltd., Nagoya (JP)

(72) Inventors: Kazumi Mase, Nagoya (JP); Yoshiyuki Kasai, Nagoya (JP); Yoshimasa Omiya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 371 days.

(21) Appl. No.: 14/223,144

(22) Filed: Mar. 24, 2014

(65) Prior Publication Data

US 2014/0291315 A1 Oct. 2, 2014

(30) Foreign Application Priority Data

Mar. 29, 2013 (JP) .................................. 2013-074432

(51) Int. Cl.
*H05B 3/10* (2006.01)
*F01N 3/24* (2006.01)
(Continued)

(52) U.S. Cl.
CPC ............. *F01N 3/24* (2013.01); *B01D 46/2444* (2013.01); *B01D 46/2451* (2013.01);
(Continued)

(58) Field of Classification Search
CPC . B01J 35/04; B01J 35/0033; F01N 2330/06; F01N 2330/34; F01N 2330/30; F01N 2330/48; F01N 2330/60; F01N 2240/16; F01N 2240/04; F01N 2260/08; F01N 3/2808; F01N 3/2828; F01N 3/2026; F01N 3/24; F01N 3/2013; F01N 3/0222; B01D 53/94; B01D 53/32; B01D 46/2425; B01D 46/2429; B01D 46/2451; B01D 46/2444; B01D 2255/955; C04B 35/565; C04B 35/6316; C04B 37/005; C04B 2235/428; C04B 2235/5436; C04B 2235/945; C04B 38/0006; C04B 38/0019; C04B 38/0009; C04B 38/0054; C04B 38/0074; C04B 2111/00793; C04B 2111/0001; H05B 3/10; H05B 3/42; Y02T 10/26; Y10T 428/24165; Y10T 428/24149

See application file for complete search history.

(56) References Cited

U.S. PATENT DOCUMENTS 5,063,029 A 11/1991 Mizuno et al.
5,200,154 A 4/1993 Harada et al.
(Continued)

FOREIGN PATENT DOCUMENTS

EP 0 465 237 A2 1/1992
EP 0 502 726 A1 9/1992
EP 2 832 446 A1 2/2015
JP H04-280086 A 10/1992
(Continued)

OTHER PUBLICATIONS

Extended European Search Report (Application No. 14162328.0) dated Mar. 5, 2015 (in English).

*Primary Examiner* — Shawntina Fuqua
(74) *Attorney, Agent, or Firm* — Burr & Brown, PLLC

(57) ABSTRACT

A honeycomb structure includes a honeycomb structure body and a pair of electrode members, an electrical resistivity of the honeycomb structure body is from 1 to 200 Ωcm, each of the pair of electrode members is formed into a band-like shape extending in a cell extending direction of the honeycomb structure body, one electrode member is disposed on a side opposite to the other electrode member via a center of the honeycomb structure body, there are formed one or more electrode member slits as slits opened in an electrode member region, there are formed one or more honeycomb structure body slits as slits opened in a honeycomb structure body region, and a depth of at least one of the electrode member slits is deeper than a depth of at least one of the honeycomb structure body slits.

17 Claims, 7 Drawing Sheets

(51) Int. Cl.
    *C04B 37/00*     (2006.01)
    *C04B 38/00*     (2006.01)
    *F01N 3/28*     (2006.01)
    *B01D 46/24*     (2006.01)
    *F01N 3/20*     (2006.01)
    *F01N 3/022*     (2006.01)
    *B01J 35/04*     (2006.01)

(52) U.S. Cl.
    CPC ........ *C04B 37/005* (2013.01); *C04B 38/0019* (2013.01); *F01N 3/0222* (2013.01); *F01N 3/2013* (2013.01); *F01N 3/2828* (2013.01); *H05B 3/10* (2013.01); *B01J 35/04* (2013.01); *C04B 2235/945* (2013.01); *F01N 2240/04* (2013.01); *F01N 2330/06* (2013.01); *Y02T 10/26* (2013.01)

(56) References Cited

U.S. PATENT DOCUMENTS

| | | | |
|---|---|---|---|
| 5,245,825 | A | 9/1993 | Ohhashi et al. |
| 5,288,975 | A | 2/1994 | Kondo |
| 5,463,206 | A | 10/1995 | Abe et al. |
| RE35,134 | E | 12/1995 | Mizuno et al. |
| 2003/0134084 | A1 | 7/2003 | Ichikawa et al. |
| 2013/0043236 | A1 | 2/2013 | Sakashita et al. |
| 2013/0277360 | A1 | 10/2013 | Noro et al. |
| 2015/0030510 | A1 | 1/2015 | Mase et al. |

FOREIGN PATENT DOCUMENTS

| | | |
|---|---|---|
| JP | 05-144549 A1 | 6/1993 |
| JP | 2931362 B2 | 8/1999 |
| JP | 4136319 B2 | 8/2008 |
| JP | 2010-229976 A | 10/2010 |
| WO | 2011/125815 A1 | 10/2011 |
| WO | 2012/086815 A1 | 6/2012 |

HONEYCOMB STRUCTURE

The present application is an application based on JP-2013-074432 filed on Mar. 29, 2013 with the Japanese Patent Office, the entire contents of which are incorporated herein by reference.

BACKGROUND OF THE INVENTION

Field of the Invention

The present invention relates to a honeycomb structure. More particularly, it relates to a honeycomb structure which is a catalyst carrier and also functions as a heater when a voltage is applied thereto and which can inhibit an unevenness of a temperature distribution when the voltage is applied thereto and can enhance heat shock resisting properties.

Background Art

Heretofore, a product in which a catalyst is loaded onto a honeycomb structure made of cordierite has been used for a treatment of harmful substances in an exhaust gas discharged from a car engine. Furthermore, it has also been known that a honeycomb structure formed from a sintered silicon carbide body is used for purification of the exhaust gas (e.g., see Patent Document 1).

When the exhaust gas is treated by the catalyst loaded onto the honeycomb structure, it is necessary to raise a temperature of the catalyst to a predetermined temperature, but the catalyst temperature is low at start of the engine, which has caused a problem that the exhaust gas is not sufficiently purified.

Consequently, there has been investigated a method of disposing a heater made of a metal on an upstream side of the honeycomb structure onto which the catalyst is loaded to raise the temperature of the exhaust gas (e.g., see Patent Document 2). Furthermore, a method has been investigated in which the catalyst is loaded and used on the heater made of the metal (e.g., see Patent Document 3).

Furthermore, it has been suggested that a honeycomb structure body made of a ceramic material is used as "a heatable catalyst carrier" (e.g., see Patent Document 4).
[Patent Document 1] JP 4136319
[Patent Document 2] JP 2931362
[Patent Document 3] JP-A-5-144549
[Patent Document 4] WO 2011/125815

SUMMARY OF THE INVENTION

When such a heater as described above is mounted and used on a car, a power source for use in an electric system of the car is used in common and, for example, a power source of a high voltage of 200 V is used. However, the heater made of the metal has a low electric resistance. Therefore, when the power source of such a high voltage is used, a current excessively flows, which has caused a problem that a power source circuit is damaged.

Furthermore, in Patent Documents 2 and 3, a slit as a resistance adjustment mechanism is formed in the heater, to prevent the excessive flow of the current and suitably generate heat by energization. This slit is formed so that the current does not flow at the shortest distance (linearly) between a pair of electrodes.

Furthermore, a honeycomb structure described in Patent Document 4 is made of a ceramic material having a predetermined electrical resistivity, and hence by energization, heat is suitably generated without any damages or the like of an electric circuit. The honeycomb structure described in Patent Document 4 is excellent as an energization heat generation type catalyst carrier, but a further improvement has been required for heat shock resisting properties.

The present invention has been developed in view of the above-mentioned problems, and an object thereof is to provide a honeycomb structure which is a catalyst carrier and also functions as a heater when a voltage is applied thereto and which can inhibit an unevenness of a temperature distribution when the voltage is applied thereto and can enhance heat shock resisting properties.

To solve the above-mentioned problems, according to the present invention, there is provided a honeycomb structure in the following.

[1] A honeycomb structure including a tubular honeycomb structure body having porous partition walls to define and form a plurality of cells which become through channels for a fluid and extend from one end surface to the other end surface, and an outer peripheral wall positioned in the most outer periphery; and a pair of electrode members disposed on a side surface of the honeycomb structure body, wherein an electrical resistivity of the honeycomb structure body is from 1 to 200 Ωcm, each of the pair of electrode members is formed into a band-like shape extending in an extending direction of the cells of the honeycomb structure body, and in a cross section perpendicular to the cell extending direction, one electrode member in the pair of electrode members is disposed on a side opposite to the other electrode member in the pair of electrode members via a center of the honeycomb structure body, the honeycomb structure having an outer periphery constituted of electrode member regions as regions where the electrode members are disposed, and honeycomb structure body regions as regions where the side surface of the honeycomb structure body is exposed, wherein there are formed one or more electrode member slits as slits opened in the electrode member region, there are formed one or more honeycomb structure body slits as slits opened in the honeycomb structure body region, an electrode member slit open frontal area as a portion of the electrode member slit opened in the electrode member region is formed to extend in the cell extending direction, a honeycomb structure body slit open frontal area as a portion of the honeycomb structure body slit opened in the honeycomb structure body region is formed to extend in the cell extending direction, and in the cross section perpendicular to the cell extending direction, a length (a depth) of at least one of the electrode member slits is longer than that of at least one of the honeycomb structure body slits.

[2] The honeycomb structure according to the above [1], wherein in the cross section perpendicular to the cell extending direction, lengths (depths) of all the electrode member slits are longer (deeper) than those of all the honeycomb structure body slits, the electrode member slit having the electrode member slit open frontal area at a position closer to a central portion of the electrode member region has a longer (deeper) length (depth), and the honeycomb structure body slit having the honeycomb structure body slit open frontal area at a position closer to a central portion of the honeycomb structure body region has a shorter (shallower) length (depth).

[3] The honeycomb structure according to the above [1] or [2], having the electrode member slit in which the electrode member slit open frontal area is formed in a central portion of the electrode member region in an outer peripheral direction, and having the honeycomb structure body slit in which the honeycomb structure body slit open frontal area is formed in a central portion of the honeycomb structure body region in the outer peripheral direction.

[4] The honeycomb structure according to any one of the above [1] to [3], wherein at least one of the electrode member slit and the honeycomb structure body slit is formed so that the slit does not intersect a straight line connecting central portions of the pair of electrode members to each other in the cross section perpendicular to the cell extending direction.

[5] The honeycomb structure according to any one of the above [1] to [4], wherein in the cross section perpendicular to the cell extending direction, the length (the depth) of the slit is a length (a depth) of 1 to 80% of a radius of the honeycomb structure body.

[6] The honeycomb structure according to any one of the above [1] to [5], wherein a length (a width) of each of the electrode member slit open frontal area and the honeycomb structure body slit open frontal area in an outer peripheral direction is a length (a width) of 0.3 to 5.0% of a length of an outer periphery of the honeycomb structure body.

[7] The honeycomb structure according to any one of the above [1] to [6], wherein the electrode member slit is formed in parallel with a straight line connecting central portions of the pair of electrode members to each other in the cross section perpendicular to the cell extending direction.

[8] The honeycomb structure according to any one of the above [1] to [7], wherein the number of the slits is from 1 to 20.

[9] The honeycomb structure according to any one of the above [1] to [8], having a filling material to be filled into the at least one slit, wherein the filling material is filled into at least a part of a space of the slit.

[10] The honeycomb structure according to the above [9], wherein the filling material is filled into the whole space of the slit.

[11] The honeycomb structure according to the above [9] or [10], wherein a Young's modulus of the filling material is from 0.001 to 20 GPa.

[12] The honeycomb structure according to any one of the above [9] to [11], wherein a porosity of the filling material is from 40 to 80%.

[13] The honeycomb structure according to any one of the above [9] to [12], wherein an electrical resistivity of the filling material is from 100 to 100000% of the electrical resistivity of the honeycomb structure body.

In a honeycomb structure of the present invention, an electrical resistivity of a honeycomb structure body is from 1 to 200 Ωcm. Therefore, even when a current is allowed to flow by using a power source of a high voltage, the current does not excessively flow, and the honeycomb structure can suitably be used as a heater.

Furthermore, in the honeycomb structure of the present invention, each of a pair of electrode members is formed into a band-like shape extending in an extending direction of cells of the honeycomb structure body. Furthermore, in the honeycomb structure of the present invention, in a cross section perpendicular to the cell extending direction, one electrode member in the pair of electrode members is disposed on a side opposite to the other electrode member in the pair of electrode members via a center of the honeycomb structure body. Consequently, in the honeycomb structure of the present invention, it is possible to inhibit an unevenness of a temperature distribution when a voltage is applied to the honeycomb structure.

Furthermore, in the honeycomb structure of the present invention, an electrode member slit opened in an electrode member region in an outer periphery is formed, and a honeycomb structure body slit opened in a honeycomb structure body region in the outer periphery is formed. Furthermore, in the cross section perpendicular to the cell extending direction, at least one electrode member slit is formed to be longer than at least one honeycomb structure body slit. Therefore, heat shock resisting properties can be enhanced.

DESCRIPTION OF THE PREFERRED EMBODIMENTS

Next, modes for carrying out the present invention will be described in detail with reference to the drawings. It should be understood that the present invention is not limited to the following embodiments and that changes, improvements and the like of design can suitably be added on the basis of ordinary knowledge of a person skilled in the art without departing from the gist of the present invention.

Figure 1:
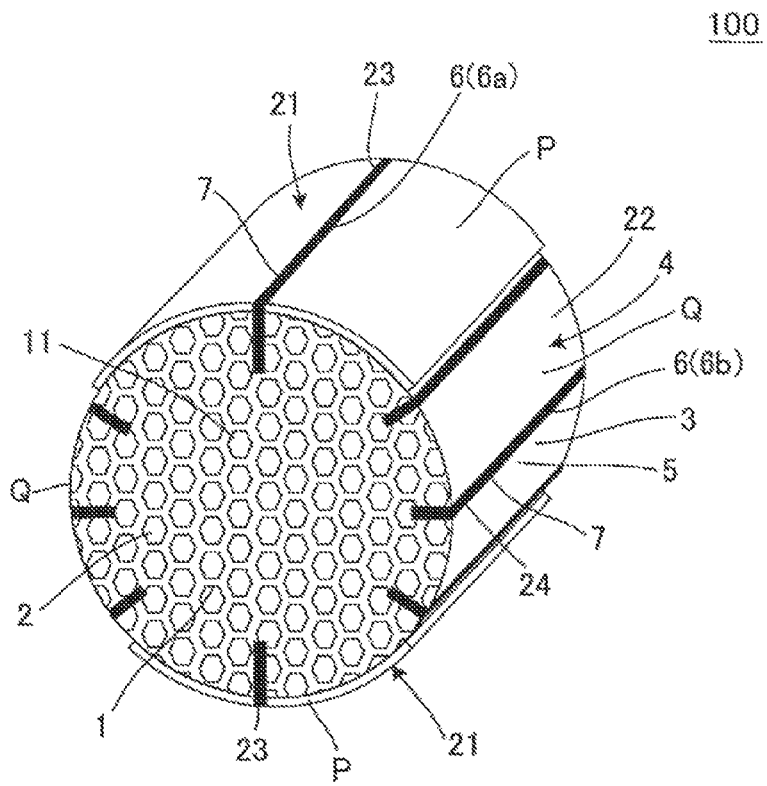
FIG. 1 is a perspective view schematically showing one embodiment of a honeycomb structure of the present invention.
Figure 2:
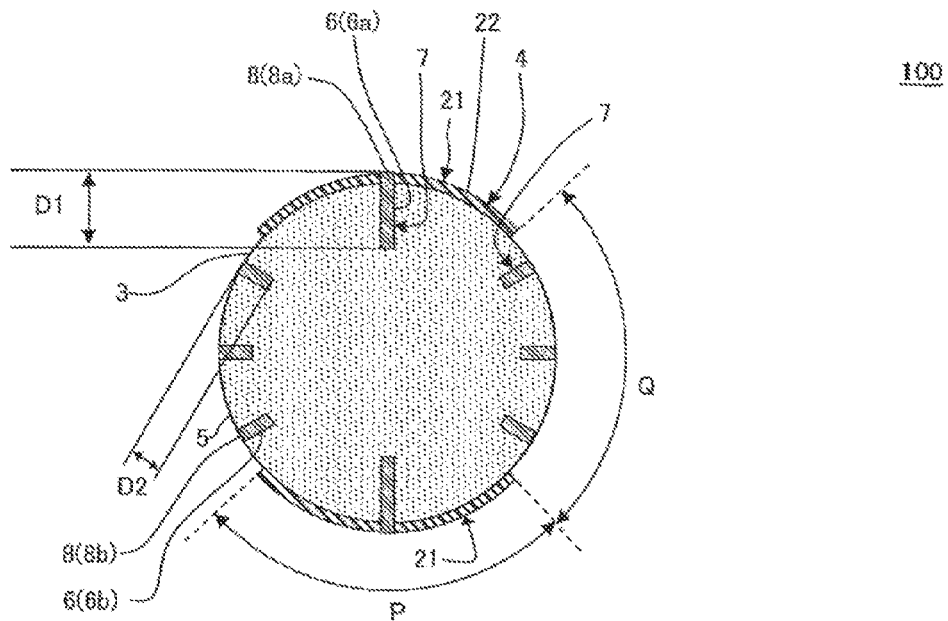
FIG. 2 is a schematic view showing a cross section perpendicular to a cell extending direction in the one embodiment of the honeycomb structure of the present invention.
Figure 3:
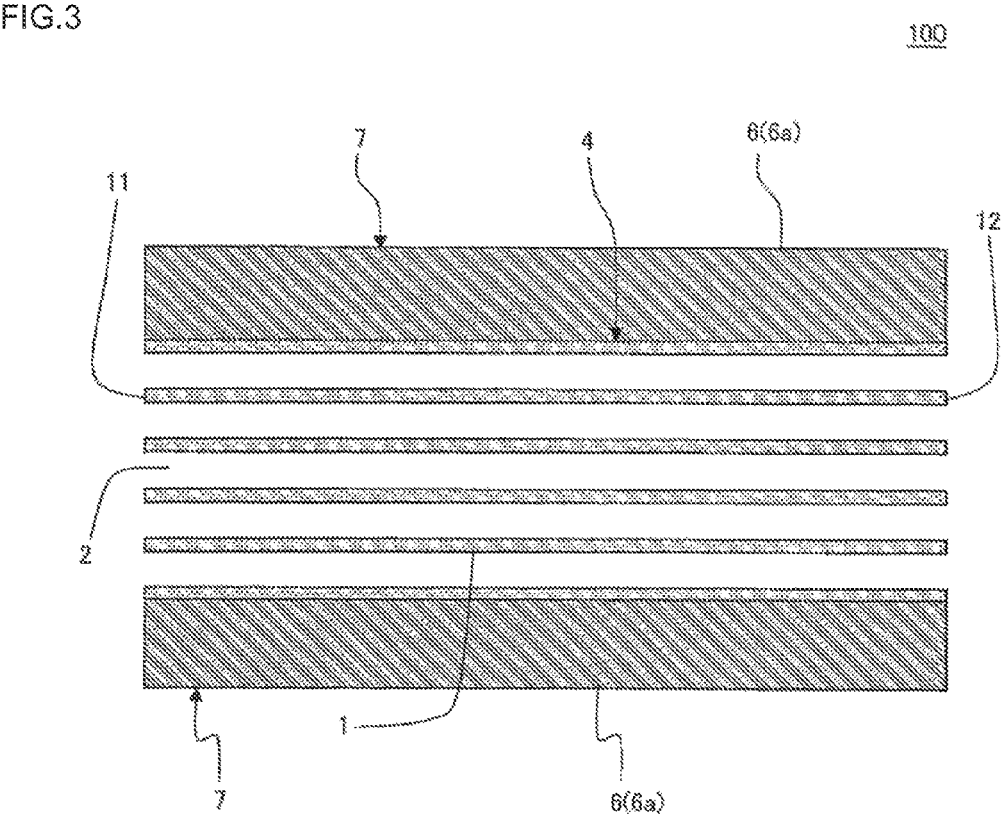
FIG. 3 is a schematic view showing a cross section parallel to the cell extending direction in the one embodiment of the honeycomb structure of the present invention.
Figure 4:
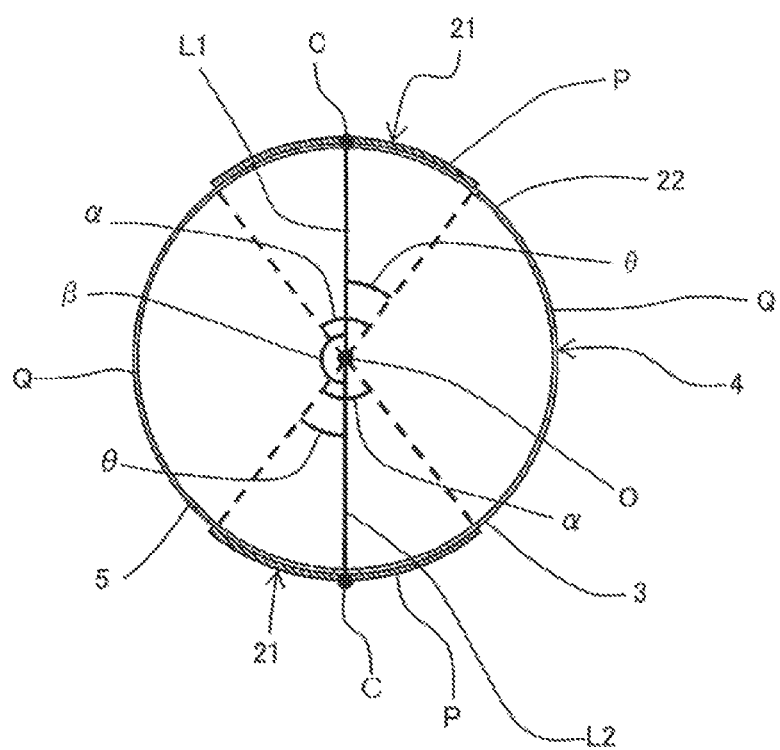
FIG. 4 is a schematic view showing the cross section perpendicular to the cell extending direction in the one embodiment of the honeycomb structure of the present invention.

(1) Honeycomb Structure:

As shown in FIG. 1 to FIG. 4, one embodiment of a honeycomb structure of the present invention includes a tubular honeycomb structure body 4 and a pair of electrode members 21, 21 disposed on a side surface 5 of the honeycomb structure body 4. The tubular honeycomb structure body 4 has porous partition walls 1 to define and form a plurality of cells 2 which become through channels for a fluid and extend from one end surface 11 to the other end surface 12, and an outer peripheral wall 3 positioned in the most outer periphery. Furthermore, an electrical resistivity of the honeycomb structure body 4 is from 1 to 200 Ωcm. Furthermore, each of the pair of electrode members 21, 21 is formed into a band-like shape extending in an extending direction of the cells 2 of the honeycomb structure body 4. Furthermore, in a cross section perpendicular to the extending direction of the cells 2, one electrode member 21 in the pair of electrode members 21, 21 is disposed on a side opposite to the other electrode member 21 in the pair of electrode members 21, 21 via a center O of the honeycomb structure body 4. Furthermore, a honeycomb structure 100 of the present embodiment has an outer periphery 22 constituted of electrode member regions P as regions where the electrode members 21 are disposed and honeycomb structure body regions Q as regions where the side surface 5 of the honeycomb structure body 4 is exposed. Furthermore, in the honeycomb structure 100 of the present embodiment, there are formed one or more electrode member slits 6a as slits 6 opened in the electrode member regions P, and there are formed one or more honeycomb structure body slits 6b as the slits 6 opened in the honeycomb structure body regions Q. Furthermore, an electrode member slit open frontal area 8a as a portion (an open frontal area 8) of the electrode member slit 6a opened in the electrode member region P is formed to extend in the extending direction of the cells 2. Furthermore, a honeycomb structure body slit open frontal area 8b as a portion (the open frontal area 8) of the honeycomb structure body slit 6b opened in the honeycomb structure body region Q is formed to extend in the extending direction of the cells 2. Furthermore, in the cross section perpendicular to the extending direction of the cells 2, a length of at least one of the electrode member slits 6a is longer than that of at least one of the honeycomb structure body slits 6b. It is to be noted that the length of the slit in the cross section perpendicular to the cell extending direction is referred to as "a depth" of the slit sometimes. Furthermore, the side surface 5 of the honeycomb structure body 4 is the surface of the outer peripheral wall 3 of the honeycomb structure body 4. Furthermore, the outer periphery of the honeycomb structure 100 is constituted of the electrode member regions P and the honeycomb structure body regions Q. It can be considered that the outer periphery of the honeycomb structure is constituted of the surfaces of the electrode members 21 and "the exposed surfaces of the honeycomb structure body". FIG. 1 is a perspective view schematically showing one embodiment of the honeycomb structure of the present invention. FIG. 2 is a schematic view showing the cross section perpendicular to the cell extending direction in the one embodiment of the honeycomb structure of the present invention. FIG. 3 is a schematic view showing a cross section parallel to the cell extending direction in the one embodiment of the honeycomb structure of the present invention. FIG. 4 is a schematic view showing the cross section perpendicular to the cell extending direction in the one embodiment of the honeycomb structure of the present invention. In FIG. 2, the cells and the partition walls are omitted. In FIG. 4, the cells, the partition walls, the slits and the filling material are omitted.

As described above, in the honeycomb structure 100 of the present embodiment, the electrical resistivity of the honeycomb structure body 4 is from 1 to 200 Ωcm. Therefore, even when a current is allowed to flow by using a power source of a high voltage, the current does not excessively flow, so that the honeycomb structure can suitably be used as a heater. Furthermore, in the honeycomb structure 100 of the present embodiment, each of the pair of electrode members 21, 21 is formed into the band-like shape extending in the extending direction of the cells 2 of the honeycomb structure body 4. Furthermore, in the honeycomb structure 100 of the present embodiment, in the cross section perpendicular to the extending direction of the cells 2, the one electrode member 21 in the pair of electrode members 21, 21 is disposed on the side opposite to the other electrode member 21 in the pair of electrode members 21, 21 via the center O of the honeycomb structure body 4. Therefore, the honeycomb structure 100 of the present embodiment can inhibit an unevenness of a temperature distribution when a voltage is applied thereto. The electrode member slit 6a opened in the electrode member region P of the outer periphery 22 is formed, and the honeycomb structure body slit 6b opened in the honeycomb structure body region Q of the outer periphery 22 is formed. Furthermore, in the cross section perpendicular to the extending direction of the cells 2, the at least one electrode member slit 6a is formed to be longer than the at least one honeycomb structure body slit 6b. Consequently, heat shock resisting properties can be enhanced. Furthermore, in the cross section perpendicular to the extending direction of the cells 2, the at least one electrode member slit 6a is preferably formed to be longer than all the honeycomb structure body slits 6b. In consequence, the heat shock resisting properties can further be enhanced.

Here, when "in the cross section perpendicular to the extending direction of the cells 2, the one electrode member 21 in the pair of electrode members 21, 21 is disposed on the side opposite to the other electrode member 21 in the pair of electrode members 21, 21 via the center O of the honeycomb structure body 4", the following is meant. That is, as shown in FIG. 4, first in the cross section perpendicular to the cell extending direction, "a line segment connecting a central portion C of the one electrode member 21 (a central point in "a peripheral direction of the honeycomb structure body 4") to the center O of the honeycomb structure body 4" is a line segment L1. Furthermore, in the cross section perpendicular to the extending direction of the cells 2, "a line segment connecting a central portion C of the other electrode member 21 (a central point in "the peripheral direction of the honeycomb structure body 4") to the center O of the honeycomb structure body 4" is a line segment L2. At this time, it is meant that the pair of electrode members 21, 21 are disposed in the honeycomb structure body 4 in such a positional relation that an angle β formed by the line segment L1 and the line segment L2 (an angle around "the center O") is in a range of 170° to 190°.

In the honeycomb structure 100 of the present embodiment, in the cross section perpendicular to the extending direction of the cells 2, a depth D1 of the at least one electrode member slit 6a is deeper than a depth D2 of the at least one honeycomb structure body slit 6b. Furthermore, all the electrode member slits 6a are preferably formed to be deeper than all the honeycomb structure body slits 6b. As described above, the depth D1 of the electrode member slit 6a is deeper than the depth D2 of the honeycomb structure body slit 6b, whereby even when a temperature change, heat shock or the like occurs, cracks can be prevented from being generated in the vicinities of the electrode members. In the honeycomb structure 100 shown in FIG. 1, one slit (the electrode member slit 6a) is formed in each of the two electrode member regions P. Furthermore, in each of the two honeycomb structure body regions Q, three slits (the honeycomb structure body slits 6b) are formed.

Figure 5:
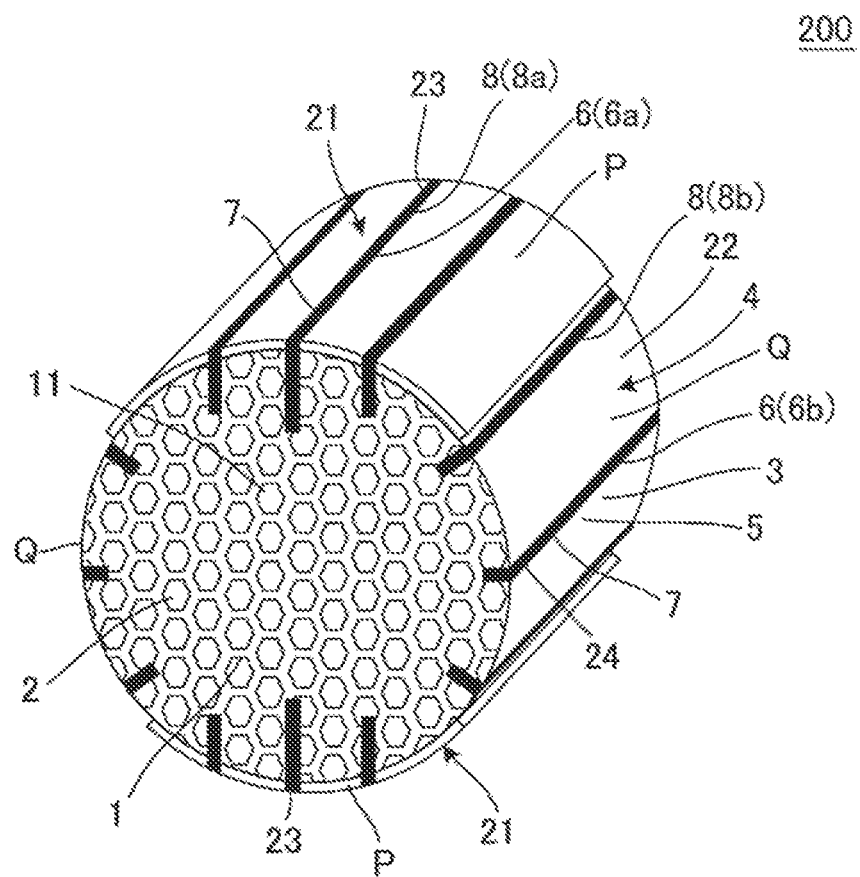
FIG. 5 is a perspective view schematically showing another embodiment of the honeycomb structure of the present invention.

In a honeycomb structure 200 shown in FIG. 5, "an electrode member slit 6a having an electrode member slit open frontal area 8a at a position closer to a central portion of the electrode member region P" has a larger depth. Furthermore, "a honeycomb structure body slit 6b having a honeycomb structure body slit open frontal area 8b at a position closer to a central portion of a honeycomb structure body region Q" has a larger depth. Furthermore, all the electrode member slits 6a are formed to be deeper than all the honeycomb structure body slits 6b. In consequence, heat shock resisting properties can more effectively be enhanced. In the honeycomb structure 200 shown in FIG. 5, three slits (the electrode member slits 6a) are formed in each of two electrode member regions P. Furthermore, three slits (the honeycomb structure body slits 6b) are formed in each of the two honeycomb structure body regions Q. In the honeycomb structure 200, the electrode member slit 6a is formed in parallel with a straight line connecting central portions of a pair of electrode members to each other, in a cross section perpendicular to a cell extending direction. Furthermore, in the cross section perpendicular to the cell extending direction, the honeycomb structure body slit 6b is formed to extend toward a central portion of the honeycomb structure body. The honeycomb structure 200 shown in FIG. 5 preferably has conditions similar to those of the honeycomb structure 100 shown in FIG. 1, except a way to cut the slits. FIG. 5 is a perspective view schematically showing another embodiment (the honeycomb structure 200) of the honeycomb structure of the present invention.

Furthermore, the central portion of the electrode member region P in an outer peripheral direction will be referred to as an electrode central portion 23 sometimes, and the central portion of the honeycomb structure body region Q in the outer peripheral direction will be referred to as a honeycomb central portion 24 sometimes. At this time, the honeycomb structure preferably has the electrode member slit 6a in which the electrode member slit open frontal area 8a is formed in the electrode central portion 23, and has the honeycomb structure body slit 6b in which the honeycomb structure body slit open frontal area 8b is formed in the honeycomb central portion 24. The electrode member slit open frontal area 8a is opened in the surface of an electrode member 21, and the electrode member 21 is preferably divided by the electrode member slit open frontal area 8a. When the electrode member 21 is completely divided by the electrode member slit open frontal area 8a, the respective divided electrode members 21 need to be connected to the power source.

In the cross section of the honeycomb structure 100 of the present embodiment which is perpendicular to the extending direction of the cells 2, the slit 6 formed so that the slit does not intersect the straight line connecting the central portions C, C of the pair of electrode members 21, 21 to each other will be referred to as "a non-intersecting slit" sometimes. At this time, at least one of the electrode member slit 6a and the honeycomb structure body slit 6b is preferably the non-intersecting slit. Furthermore, the slits 6 of 50% or more of the slits 6 are preferably the non-intersecting slits. Furthermore, all the slits 6 formed in the honeycomb structure body 4 are further preferably the non-intersecting slits. The percentage of the non-intersecting slits is 50% or more of all the slits 6, so that a mechanical strength of the honeycomb structure 100 can be prevented from being deteriorated (the honeycomb structure 100 of the present embodiment has an excellent mechanical strength). When the percentage of the non-intersecting slits is smaller than 50% of all the slits 6, the mechanical strength of the honeycomb structure 100 deteriorates sometimes. Furthermore, when the percentage of the non-intersecting slits is smaller than 50% of all the slits 6, the flow of the current flowing between the pair of electrode members 21 and 21 is noticeably disturbed by the slit, and even heat generation is disturbed, which results in uneven heat generation sometimes.

In the honeycomb structure 100 of the present embodiment, the depth of the slit 6 is preferably from 1 to 80% of a radius in "the cross section perpendicular to the extending direction of the cells 2" of the honeycomb structure body 4 (hereinafter referred to as "the radius of the honeycomb structure body" sometimes). Furthermore, the depth of the slit 6 is further preferably from 1 to 60% and especially preferably from 1 to 30% of the radius of the honeycomb structure body. When the depth of the slit 6 is smaller than 1% of the radius of the honeycomb structure body, an effect of reducing heat shock resisting properties of the honeycomb structure 100 deteriorates sometimes. When the depth of the slit 6 is larger than 80% of the radius of the honeycomb structure body, the flow of the current flowing between the pair of electrode members 21 and 21 is noticeably disturbed by the slit, and the even heat generation is disturbed, which results in the uneven heat generation sometimes. In "the cross section perpendicular to the extending direction of the cells 2" of the honeycomb structure body 4, also as to the slit which is not directed in a center direction, the slit depth is preferably in the above-mentioned range on the basis of "the radius of the honeycomb structure body". The depth of the slit 6 is a distance from "the open frontal area" of the slit 6 "in the side surface 5" to the deepest position of the slit 6. When a plurality of slits are present, the depths of the slits 6 may vary, or all the slits may have the same depth.

In the honeycomb structure 100 of the present embodiment, a length of each of the electrode member slit open frontal area and the honeycomb structure body slit open frontal area in the outer peripheral direction will be referred to as "a width of the slit" sometimes. The width of the slit 6 is preferably from 0.3 to 5% of a length of an outer periphery of the honeycomb structure body 4 in "the cross section perpendicular to the extending direction of the cells 2" (hereinafter referred to as "the outer periphery length of the honeycomb structure body" sometimes). Furthermore, the width of the slit 6 is further preferably from 0.3 to 3% and especially preferably from 0.3 to 1% of the outer periphery length of the honeycomb structure body. When the width of the slit 6 is smaller than 0.3% of the outer periphery length of the honeycomb structure body, the effect of reducing the heat shock resisting properties of the honeycomb structure 100 can deteriorates sometimes. When the width of the slit 6 is larger than 5% of the outer periphery length of the honeycomb structure body, the mechanical strength of the honeycomb structure 100 deteriorates sometimes. The width of the slit 6 is "the length of each of the electrode member slit open frontal area and the honeycomb structure body slit open frontal area in the outer peripheral direction". "The outer peripheral direction" is a direction along the outer periphery of the honeycomb structure in "the cross section perpendicular to the extending direction of the cells 2". The widths of the slits 6 may vary, or all the slits may have the same width. Furthermore, the width of the slit 6 is the width per slit, when the plurality of slits are present.

In the honeycomb structure 100 of the present embodiment, the number of the slits 6 is preferably from 1 to 20, further preferably from 2 to 15, and especially preferably from 2 to 10. When the number of the slits 6 is in excess of 20, the mechanical strength of the honeycomb structure 100 deteriorates sometimes. In the honeycomb structure 100 shown in FIG. 1, eight slits 6 are formed.

In the honeycomb structure 100 of the present embodiment, the length of the slit 6 in "the cell extending direction" is preferably the same as the length of the honeycomb structure body in "the cell extending direction". That is, the slit 6 is preferably formed between both the end surfaces (along the whole length) of the honeycomb structure body. The length of the slit 6 in "the cell extending direction" is referred to as "the length of the slit" sometimes.

Furthermore, a slit forming pattern (including "the number of the slits"), the depth of the slit, the width of the slit and the length of the slit is preferably linearly symmetric via a center line (the line connecting the central portions of the pair of electrode members to each other) which is an axis of symmetry.

In the honeycomb structure 100 of the present embodiment, in the cross section perpendicular to the extending direction of the cells 2, the extending direction of the honeycomb structure body slit 6b is preferably a direction toward the center O of the honeycomb structure body 4. In consequence, it is possible to inhibit "the flow of the current between the pair of electrode members from being disturbed by the slit". Furthermore, the electrode member slit 6a is preferably formed in parallel with a line segment connecting the electrode central portions 23, 23 of the pair of electrode members 21, 21 to each other. In consequence, it is possible to inhibit "the flow of the current between the pair of electrode members from being disturbed by the slit".

In the honeycomb structure 100 of the present embodiment, a material of the partition walls 1 and the outer peripheral wall 3 preferably contains a metal silicon-silicon carbide composite material or silicon carbide as a main component, and is further preferably the metal silicon-silicon carbide composite material or silicon carbide. When "the material of the partition walls 1 and the outer peripheral wall 3 contains silicon carbide particles and metal silicon as main components", it is meant that the partition walls 1 and the outer peripheral wall 3 contain the silicon carbide particles and metal silicon (a total mass) as much as 90 mass % or more of the whole material. By using such a material, the electrical resistivity of the honeycomb structure body can be regulated to a range of 1 to 200 Ωcm. Here, the metal silicon-silicon carbide composite material contains the silicon carbide particles as an aggregate and metal silicon as a binding material which binds the silicon carbide particles, and a plurality of silicon carbide particles are preferably bound by metal silicon so as to form pores among the silicon carbide particles. Furthermore, the silicon carbide is sintered silicon carbide. The electrical resistivity of the honeycomb structure body is a value at 400° C.

The honeycomb structure 100 of the present embodiment has a filling material 7 to be filled into at least one slit 6, and the filling material 7 is preferably filled into at least a part of a space of the slit 6. Furthermore, the filling material is preferably filled into the slits of 50% or more of the slits 6. Furthermore, the filling material is preferably filled into all the slits 6. Furthermore, the filling material 7 is preferably filled into the whole "space of the slit 6". In the honeycomb structure 100 shown in FIG. 1, eight slits 6 are formed. Furthermore, as to each of all the slits 6, the filling material 7 is filled into the whole space of the slit 6. As described above, the filling material is filled into the slits 6, which can enhance an isostatic strength of the honeycomb structure. When the filling material is "filled into at least a part", the part may be "a part" of the slit in a depth direction thereof, "a part" of the slit in a length direction thereof, or a combination of these parts.

The filling material 7 preferably contains silicon carbide as much as 20 mass % or more, and further preferably contains silicon carbide as much as 20 to 50 mass %, when the main component of the honeycomb structure body is silicon carbide or the metal silicon-silicon carbide composite material. In consequence, a thermal expansion coefficient of the filling material 7 can be a value close to a thermal expansion coefficient of the honeycomb structure body, which can enhance the heat shock resisting properties of the honeycomb structure. The filling material 7 may contain silica, alumina or the like as much as 50 mass % or more.

In the honeycomb structure 100 of the present embodiment, a Young's modulus of the filling material 7 is preferably from 0.001 to 20 GPa, further preferably from 0.005 to 15 GPa, and especially preferably from 0.01 to 10 GPa. When the Young's modulus is lower than 0.001 GPa, the mechanical strength of the honeycomb structure 100 deteriorates sometimes. When the Young's modulus is higher than 20 GPa, the heat shock resisting properties of the honeycomb structure 100 deteriorate sometimes.

In the honeycomb structure 100 of the present embodiment, a porosity of the filling material 7 is preferably from 40 to 80%, further preferably from 43 to 70%, and especially preferably from 45 to 65%. When the porosity is lower than 40%, the mechanical strength of the honeycomb structure 100 deteriorates sometimes. When the porosity is higher than 80%, the heat shock resisting properties of the honeycomb structure 100 deteriorate sometimes.

In the honeycomb structure 100 of the present embodiment, an electrical resistivity of the filling material 7 is preferably from 100 to 100000% of the electrical resistivity of the honeycomb structure body 4. Furthermore, the electrical resistivity of the filling material 7 is further preferably from 200 to 100000% and especially preferably from 300 to 100000% of the electrical resistivity of the honeycomb structure body 4. When the electrical resistivity is lower than 100%, the current easily flows through the filling material 7, which makes it difficult to allow the current to evenly flow through the honeycomb structure body sometimes. Even when the electrical resistivity of the filling material 7 is excessively high, there are not especially any problems. The filling material 7 may be an insulator. The electrical resistivity of the filling material 7 actually has an upper limit of about 100000% of the electrical resistivity of the honeycomb structure body 4. As the filling material 7, a plurality of types of filling materials may be used together. For example, the filling materials may be used separately for portions of one slit or separately for the slits.

In the honeycomb structure 100 of the present embodiment, the pair of electrode members 21, 21 are disposed on the side surface 5 of the honeycomb structure body 4. In the honeycomb structure 100 of the present embodiment, the voltage is applied between the pair of electrode members 21 and 21, thereby generating heat. The voltage to be applied is preferably from 12 to 900 V and further preferably from 64 to 600 V.

Each of the pair of electrode members 21, 21 is formed into "the band-like shape" extending in the extending direction of the cells 2 of the honeycomb structure body 4. Furthermore, in the cross section perpendicular to the extending direction of the cells 2, the one electrode member 21 in the pair of electrode members 21, 21 is disposed on the side opposite to the other electrode member 21 in the pair of electrode members 21, 21 via the center O of the honeycomb structure body 4. Therefore, when the voltage is applied between the pair of electrode members 21 and 21, it is possible to inhibit the unevenness of the current flowing in the honeycomb structure body 4. In consequence, it is possible to inhibit the unevenness of the heat generation in the honeycomb structure body 4. Furthermore, as shown in FIG. 4, in the cross section of the honeycomb structure 100 of the present embodiment which is perpendicular to the extending direction of the cells 2, an angle of 0.5 times a central angle α of each of the electrode members 21, 21 (an angle θ of 0.5 times the central angle α) is preferably from 15 to 65°. In consequence, the unevenness of the heat generation in the honeycomb structure body 4 can more effectively be inhibited. As described above, in a shape of the electrode member 21, "the angle of 0.5 times the central angle α of the electrode member 21 is from 15 to 65° and the electrode member extends in the cell extending direction", and such a shape is one configuration of "the band-like shape". Moreover, as shown in FIG. 4, "the central angle α of the electrode member 21" is an angle formed by two line segments connecting both ends of the electrode member 21 to the center O of the honeycomb structure body 4 in the cross section perpendicular to the cell extending direction. In other words, "the central angle α of the electrode member 21" in the perpendicular cross section is an inner angle of a portion of the center O in a shape (e.g., a fan shape or the like) formed by "the electrode member 21", "the line segment connecting one end portion of the electrode member 21 to the center O" and "the line segment connecting the other end portion of the electrode member 21 to the center O". Here, "the perpendicular cross section" is "the cross section perpendicular to the cell extending direction of the honeycomb structure".

In the cross section perpendicular to the extending direction of the cells 2, an upper limit value of "the angle θ of 0.5 times the central angle α" of each of the electrode members 21, 21 is further preferably 60° and especially preferably 55°. Furthermore, in the cross section perpendicular to the extending direction of the cells 2, a lower limit value of "the angle θ of 0.5 times the central angle α" of each of the electrode members 21, 21 is further preferably 20° and especially preferably 30°. Furthermore, "the angle θ of 0.5 times the central angle α" of the one electrode member 21 preferably has a size of 0.8 to 1.2 times and further preferably a size of 1.0 times (the same size) to "the angle θ of 0.5 times the central angle α" of the other electrode member 21. In consequence, when the voltage is applied between the pair of electrode members 21 and 21, it is possible to inhibit the unevenness of the current flowing in the honeycomb structure body 4, which makes it possible to inhibit the unevenness of the heat generation in the honeycomb structure body 4.

A thickness of the electrode member 21 is preferably from 0.01 to 5 mm and further preferably from 0.01 to 3 mm. In such a range, the heat can evenly be generated. When the thickness of the electrode member 21 is smaller than 0.01 mm, an electric resistance heightens, and hence the heat cannot evenly be generated sometimes. When the thickness is larger than 5 mm, each electrode member is damaged sometimes during canning.

The electrode member 21 preferably contains silicon carbide particles and metal silicon as main components, and is further preferably formed by using the silicon carbide particles and metal silicon as raw materials except usually contained impurities. Here, when "the silicon carbide particles and metal silicon are contained as the main components", it is meant that a total mass of the silicon carbide particles and metal silicon is 90 mass % or more of a mass of the whole electrode member. As described above, the electrode member 21 contains the silicon carbide particles and metal silicon as the main components, whereby the components of the electrode member 21 and the components of the honeycomb structure body 4 are the same components or close components (when a material of the honeycomb structure body is silicon carbide). Therefore, the thermal expansion coefficients of the electrode member 21 and the honeycomb structure body 4 are the same value or close values. Furthermore, the materials are the same or close to each other, and hence a joining strength between the electrode member 21 and the honeycomb structure body 4 heightens. Therefore, even when heat stress is applied to the honeycomb structure, the electrode members 21 can be prevented from being peeled from the honeycomb structure body 4, or a joining portion between the electrode member 21 and the honeycomb structure body 4 can be prevented from being damaged.

As shown in FIG. 1 and FIG. 2, in the honeycomb structure 100 of the present embodiment, each of the pair of electrode members 21, 21 is formed into the band-like shape extending in the cell extending direction of the honeycomb structure body 4 and "extending between both end portions (between both the end surfaces 11 and 12)". As described above, the pair of electrode members 21, 21 are disposed to extend between both the end portions of the honeycomb structure body 4, whereby when the voltage is applied between the pair of electrode members 21 and 21, the unevenness of the current flowing in the honeycomb structure body 4 can more effectively be inhibited. Furthermore, it is accordingly possible to more effectively inhibit the unevenness of the heat generation in the honeycomb structure body 4. Here, when "the electrode member 21 is formed (disposed) to extend between both the end portions of the honeycomb structure body 4", it is meant that one end portion of the electrode member 21 comes in contact with one end portion (one end surface) of the honeycomb structure body 4 and that the other end portion of the electrode member 21 comes in contact with the other end portion (the other end surface) of the honeycomb structure body 4.

In the honeycomb structure 100 of the present embodiment, it is also a preferable configuration that both the end portions of the electrode member 21 in "the extending direction of the cells 2 of the honeycomb structure body 4" do not come in contact with (do not reach) both the end portions (both the end surfaces 11 and 12) of the honeycomb structure body 4. Furthermore, it is also a further preferable configuration that one end portion of the electrode member 21 comes in contact with (reaches) one end portion (the one end surface 11) of the honeycomb structure body 4, and the other end portion of the electrode member 21 does not come in contact with (does not reach) the other end portion (the other end surface 12) of the honeycomb structure body 4. As described above, in a structure where at least one end portion of the electrode member 21 does not come in contact with (does not reach) the end portion (the end surface) of the honeycomb structure body 4, the heat shock resisting properties of the honeycomb structure can be enhanced. That is, from the viewpoint that each of the pair of electrode members 21, 21 "enhances the heat shock resisting properties of the honeycomb structure", it is preferable that at least one end portion does not come in contact with (does not reach) the end portion (the end surface) of the honeycomb structure body 4. As seen from the above, when importance is attached to the viewpoint that "the unevenness of the current in the honeycomb structure body 4 is more effectively inhibited to more effectively inhibit the unevenness of the heat generation", the pair of electrode members 21, 21 are preferably formed to extend between both the end portions of the honeycomb structure body 4. On the other hand, when importance is attached to the viewpoint that "the heat shock resisting properties of the honeycomb structure are enhanced", it is preferable that at least one end portion of each of the pair of electrode members 21, 21 does not come in contact with (does not reach) the end portion (the end surface) of the honeycomb structure body 4. In the structure where at least one end portion of the electrode member does not come in contact with (does not reach) the end portion (the end surface) of the honeycomb structure body, the electrode member region is a region where the electrode member extending between both the end portions is disposed, when "it is supposed that the electrode member is formed to extend between both the end portions of the honeycomb structure body".

In the honeycomb structure of the present embodiment, for example, as shown in FIG. 1, the electrode member 21 has such a shape as obtained by curving a planar rectangular member along an outer periphery of a cylindrical shape. Here, a shape obtained when the curved electrode member 21 is deformed into a planar member which is not curved will be referred to as "the planar shape" of the electrode member 21. The above-mentioned "planar shape" of the electrode member 21 shown in FIG. 1 is a rectangular shape. Furthermore, "an outer peripheral shape of the electrode member" means "the outer peripheral shape in the planar shape of the electrode member". In the honeycomb structure of the present embodiment, as shown in FIG. 1, the outer peripheral shape of the band-like electrode member 21 may be a rectangular shape, but may be a shape in which corner portions of the rectangular shape are formed into a curved shape (e.g., an outwardly convex circular shape or the like). Furthermore, the outer peripheral shape of the band-like electrode member 21 may be a shape in which the corner portions of the rectangular shape are linearly chamfered (cut off).

An electrical resistivity of the electrode member 21 is preferably from 0.1 to 100 Ωcm and further preferably from 0.1 to 50 Ωcm. When the electrical resistivity of the electrode member 21 is in such a range, each of the pair of electrode members 21, 21 effectively performs a function of an electrode in a piping line where the exhaust gas of a high temperature flows. When the electrical resistivity of the electrode member 21 is smaller than 0.1 Ωcm, a temperature of the honeycomb structure body in the vicinity of each end of the electrode member 21 easily rises sometimes, in the cross section perpendicular to the cell extending direction. When the electrical resistivity of the electrode member 21 is larger than 100 Ωcm, the current does not easily flow, and hence the function of the electrode is not easily performed sometimes. The electrical resistivity of the electrode member is a value at 400° C.

A porosity of the electrode member 21 is preferably from 30 to 60% and further preferably from 30 to 55%. When the porosity of the electrode member 21 is in such a range, a suitable electrical resistivity can be obtained. When the porosity of the electrode member 21 is lower than 30%, the electrode member is disadvantageously deformed sometimes during manufacturing. When the porosity of the electrode member 21 is higher than 60%, the electrical resistivity is excessively high sometimes. The porosity is a value measured by a mercury porosimeter.

An average pore diameter of the electrode member 21 is preferably from 5 to 45 μm and further preferably from 7 to 40 μm. When the average pore diameter of the electrode member 21 is in such a range, the suitable electrical resistivity can be obtained. When the average pore diameter of the electrode member 21 is smaller than 5 μm, the electrical resistivity is excessively high sometimes. When the average pore diameter of the electrode member 21 is larger than 45 μm, a strength of the electrode member 21 weakens and hence the electrode member is easily damaged sometimes. The average pore diameter is a value measured by the mercury porosimeter.

When the main components of the electrode member 21 are silicon carbide particles and metal silicon, an average particle diameter of the silicon carbide particles contained in the electrode member 21 is preferably from 10 to 60 μm and further preferably from 20 to 60 μm. When the average particle diameter of the silicon carbide particles contained in the electrode member 21 is in such a range, the electrical resistivity of the electrode member 21 can be controlled in a range of 0.1 to 100 Ωcm. When the average particle diameter of the silicon carbide particles contained in the electrode member 21 is smaller than 10 μm, the electrical resistivity of the electrode member 21 is excessively large sometimes. When the average particle diameter of the silicon carbide particles contained in the electrode member 21 is larger than 60 μm, the strength of the electrode member 21 weakens and the electrode member is easily damaged sometimes. The average particle diameter of the silicon carbide particles contained in the electrode member 21 is a value measured by a laser diffraction method.

A ratio of a mass of metal silicon contained in the electrode member 21 to "a total of respective masses of the silicon carbide particles and metal silicon" contained in the electrode member 21 is preferably from 20 to 40 mass % and further preferably from 25 to 35 mass %. When the ratio of the mass of metal silicon to the total of the respective masses of the silicon carbide particles and metal silicon contained in the electrode member 21 is in such a range, the electrical resistivity of the electrode member 21 can be in a range of 0.1 to 100 Ωcm. When the ratio of the mass of metal silicon to the total of the respective masses of the silicon carbide particles and metal silicon contained in the electrode member 21 is smaller than 20 mass %, the electrical resistivity is excessively large sometimes. When the ratio is larger than 40 mass %, the electrode member is easily deformed sometimes during the manufacturing.

In the honeycomb structure 100 of the present embodiment, a partition wall thickness is from 50 to 200 μm and preferably from 70 to 130 μm. The partition wall thickness is in such a range, whereby when the honeycomb structure 100 is used as a catalyst carrier and a catalyst is loaded thereonto, a pressure loss during the flowing of an exhaust gas can be prevented from being excessively large. When the partition wall thickness is smaller than 50 μm, the strength of the honeycomb structure deteriorates sometimes. When the partition wall thickness is larger than 200 μm, the pressure loss during the flowing of the exhaust gas is large sometimes, in the case where the honeycomb structure 100 is used as the catalyst carrier and the catalyst is loaded thereonto.

In the honeycomb structure 100 of the present embodiment, a cell density is preferably from 40 to 150 cells/cm² and further preferably from 70 to 100 cells/cm². When the cell density is in such a range, a purification performance of the catalyst can be heightened in a state where the pressure loss during the flowing of the exhaust gas is small. When the cell density is lower than 40 cells/cm², a catalyst loading area decreases sometimes. When the cell density is higher than 150 cells/cm², the pressure loss during the flowing of the exhaust gas is large sometimes, in the case where the honeycomb structure 100 is used as the catalyst carrier and the catalyst is loaded thereonto.

In the honeycomb structure 100 of the present embodiment, an average particle diameter of the silicon carbide particles (the aggregate) constituting the honeycomb structure body 4 is preferably from 3 to 50 μm and further preferably from 3 to 40 μm. When the average particle diameter of the silicon carbide particles constituting the honeycomb structure body 4 is in such a range, the electrical resistivity of the honeycomb structure body 4 at 400° C. can be from 1 to 200 Ωcm. When the average particle diameter of the silicon carbide particles is smaller than 3 μm, the electrical resistivity of the honeycomb structure body 4 is large sometimes. When the average particle diameter of the silicon carbide particles is larger than 50 μm, the electrical resistivity of the honeycomb structure body 4 is small sometimes. Furthermore, when the average particle diameter of the silicon carbide particles is larger than 50 μm, a die for extrusion-forming is clogged with a forming raw material sometimes during the extrusion-forming of a honeycomb formed body. The average particle diameter of the silicon carbide particles is a value measured by the laser diffraction method.

In the honeycomb structure 100 of the present embodiment, the electrical resistivity of the honeycomb structure body 4 is from 1 to 200 Ωcm and preferably from 10 to 100 Ωcm. When the electrical resistivity is smaller than 1 Ωcm, the current excessively flows sometimes, for example, during energization of the honeycomb structure 100 by the power source of the high voltage of 200 V or more (the voltage is not limited to 200 V). When the electrical resistivity is larger than 200 Ωcm, the current does not easily flow and the heat is not sufficiently generated sometimes, for example, during the energization of the honeycomb structure 100 by the power source of the high voltage of 200 V or more (the voltage is not limited to 200 V). The electrical resistivity of the honeycomb structure body is a value measured by a four-terminal method.

In the honeycomb structure 100 of the present embodiment, the electrical resistivity of the electrode member 21 is preferably lower than the electrical resistivity of the honeycomb structure body 4, and further, the electrical resistivity of the electrode member 21 is further preferably 20% or less and especially preferably from 1 to 10% of the electrical resistivity of the honeycomb structure body 4. The electrical resistivity of the electrode member 21 is 20% or less of the electrical resistivity of the honeycomb structure body 4, so that the electrode member 21 more effectively functions as the electrode.

In the honeycomb structure 100 of the present embodiment, when the material of the honeycomb structure body 4 is a metal silicon-silicon carbide composite material, the ratio of "the mass of metal silicon as the binding material" contained in the honeycomb structure body 4 to the total of "the mass of the silicon carbide particles as the aggregate" contained in the honeycomb structure body 4 and "the mass of metal silicon as the binding material" contained in the honeycomb structure body 4 is preferably from 10 to 40 mass % and further preferably from 15 to 35 mass %. When the ratio is lower than 10 mass %, the strength of the honeycomb structure deteriorates sometimes. When the ratio is higher than 40 masse, the shape cannot be held sometimes during firing.

A porosity of the partition walls 1 of the honeycomb structure body 4 is preferably from 35 to 60% and further preferably from 35 to 45%. When the porosity is smaller than 35%, deformation during the firing is disadvantageously large sometimes. When the porosity is in excess of 60%, the strength of the honeycomb structure deteriorates sometimes. The porosity is a value measured by the mercury porosimeter.

An average pore diameter of the partition walls 1 of the honeycomb structure body 4 is preferably from 2 to 15 μm and further preferably from 4 to 8 μm. When the average pore diameter is smaller than 2 μm, the electrical resistivity is excessively large sometimes. When the average pore diameter is larger than 15 μm, the electrical resistivity is excessively small sometimes. The average pore diameter is a value measured by the mercury porosimeter.

Moreover, a thickness of the outer peripheral wall 3 constituting the most outer periphery of the honeycomb structure 100 of the present embodiment is preferably from 0.1 to 2 mm. When the thickness is smaller than 0.1 mm, the strength of the honeycomb structure 100 deteriorates sometimes. When the thickness is larger than 2 mm, an area of each partition wall onto which the catalyst is to be loaded is small sometimes.

In the honeycomb structure 100 of the present embodiment, a shape of the cells 2 in the cross section perpendicular to the extending direction of the cells 2 is preferably a quadrangular shape, a hexagonal shape, an octagonal shape, or any combination of these shapes. Among these shapes, a quadrangular shape and the hexagonal shape are preferable. When the cell shape is such a shape, the pressure loss during the flowing of the exhaust gas through the honeycomb structure 100 is small, and the purification performance of the catalyst is excellent.

There is not any special restriction on a shape of the honeycomb structure (a shape of the honeycomb structure body) of the present embodiment, and examples of the shape include a tubular shape with a bottom surface having a round shape (a cylindrical shape), a tubular shape with a bottom surface having an oval shape, and a tubular shape with a bottom surface having a polygonal shape (a quadrangular shape, a pentangular shape, a hexagonal shape, a heptagonal shape, an octagonal shape or the like). Furthermore, as to a size of the honeycomb structure, an area of the bottom surface is from 2000 to 20000 mm$^2$ and further preferably from 4000 to 10000 mm$^2$. Furthermore, a length of the honeycomb structure in a central axis direction is preferably from 50 to 200 mm and further preferably from 75 to 150 mm.

The isostatic strength of the honeycomb structure 100 of the present embodiment is preferably 1 MPa or more and further preferably 3 MPa or more. A larger value of the isostatic strength is more preferable, but an upper limit of the value is about 6 MPa when the material, structure and the like of the honeycomb structure 100 are taken into consideration. When the isostatic strength is smaller than 1 MPa, the honeycomb structure is easily damaged sometimes during the use of the honeycomb structure as the catalyst carrier. The isostatic strength is a value measured under static pressure in water.

The honeycomb structure 100 of the present embodiment, onto which the catalyst is loaded, is preferably used as a catalyst body.

Next, still another embodiment of the honeycomb structure of the present invention will be described.

Figure 6:
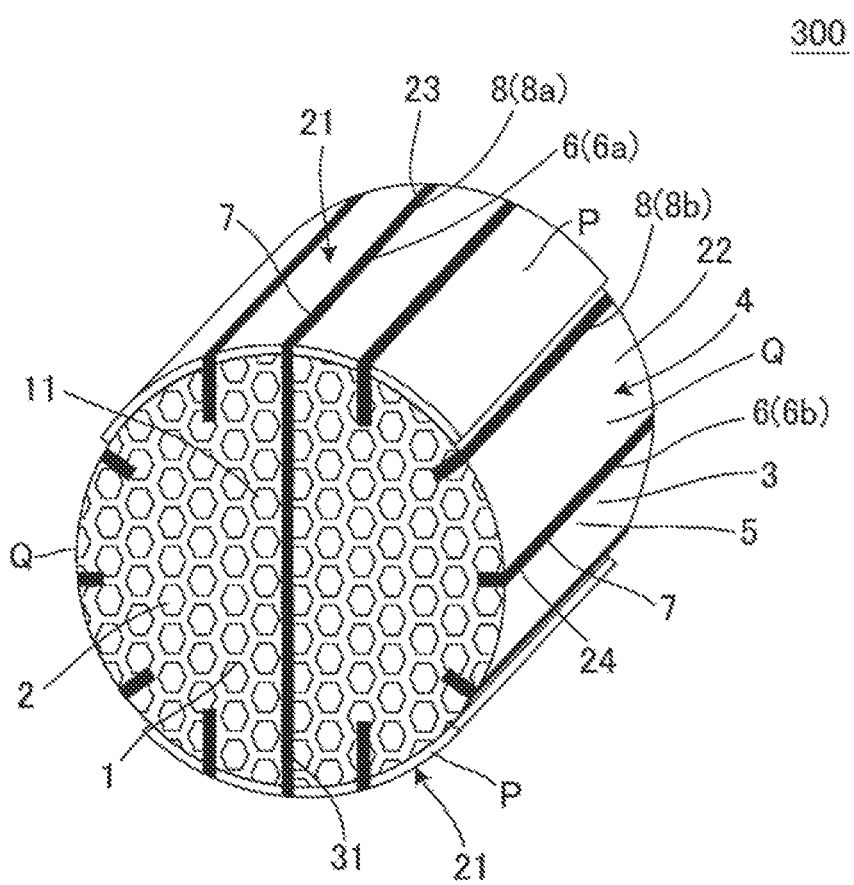
FIG. 6 is a perspective view schematically showing still another embodiment of the honeycomb structure of the present invention.

As shown in FIG. 6, a honeycomb structure 300 of the present embodiment has a structure in which a slit (an end surface slit 31) is formed in the end surface of the honeycomb structure 200 shown in FIG. 5. The end surface slit 31 is formed to communicate with "an electrode member slit 6a formed in an electrode central portion 23" and to pass the center of a honeycomb structure body in a cross section perpendicular to a cell extending direction. The end surface slit 31 communicates with the electrode member slit 6a, and hence can be considered to be one configuration (the electrode member slit) of a slit opened in an electrode member region (to share an open frontal area of the electrode member region). Here, in the end surface of the honeycomb structure, "the end surface slit 31" is a slit formed to connect two points "on an outer periphery of the end surface". Therefore, "the end surface slit 31" has two open frontal areas in the outer periphery of the honeycomb structure. In the honeycomb structure 300 shown in FIG. 6, each of two electrode member regions has one open frontal area. The honeycomb structure 300 of the present embodiment has the end surface slit in this manner, so that crack generation during temperature change can more effectively be inhibited.

Here, a diameter of the honeycomb structure 300 in the cross section perpendicular to the cell extending direction is "a honeycomb outer diameter". At this time, a length of the end surface slit 31 in the cell extending direction (a depth of the end surface slit) is preferably from 0.5 to 50% and further preferably from 1 to 30%, of the honeycomb outer diameter. When the percentage is smaller than 0.5%, the effect of inhibiting the crack generation is small sometimes. When the percentage is larger than 50%, the strength of the honeycomb structure deteriorates sometimes. Furthermore, a length of the outer periphery of the honeycomb structure 300 in the cross section perpendicular to the cell extending direction is "a honeycomb outer periphery length". At this time, a width of the end surface slit 31 is preferably from 0.1 to 10% and further preferably from 0.2 to 5% of the honeycomb outer periphery length. When the width is shorter than 0.1% of the honeycomb outer periphery length, the effect of inhibiting the crack generation is small sometimes. When the width is longer than 10% of the honeycomb outer periphery length, the strength of the honeycomb structure deteriorates sometimes.

(2) Manufacturing Method of Honeycomb Structure:

Next, one embodiment of a manufacturing method of the honeycomb structure of the present invention will be described.

First, by the following method, the honeycomb formed body is prepared. To silicon carbide powder (silicon carbide), there are added metal silicon powder (metal silicon), a binder, a surfactant, a pore former, water and the like, to prepare a forming raw material. A mass of metal silicon is preferably from 10 to 40 mass % of a total of a mass of the silicon carbide powder and the mass of metal silicon. An average particle diameter of silicon carbide particles in the silicon carbide powder is preferably from 3 to 50 μm and further preferably from 3 to 40 μm. An average particle diameter of metal silicon (the metal silicon powder) is preferably from 2 to 35 μm. The average particle diameters of the silicon carbide particles and metal silicon (metal silicon particles) are values measured by a laser diffraction method. The silicon carbide particles are fine particles of silicon carbide constituting the silicon carbide powder, and the metal silicon particles are fine particles of metal silicon constituting the metal silicon powder. It is to be noted that this is a blend of the forming raw material in a case where a material of the honeycomb structure body is a metal silicon-silicon carbide composite material, and metal silicon is not added in a case where the material of the honeycomb structure body is silicon carbide.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as pores are formed after the firing, and examples of the pore former include graphite, starch, resin balloons, a water-absorbing resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, a die is clogged sometimes during the formation. The average particle diameter of the pore former is a value measured by the laser diffraction method. When the pore former is the water-absorbing resin, the average particle diameter of the pore former is an average particle diameter after the water absorption.

Next, the forming raw material is kneaded to form a kneaded material. There is not any special restriction on a method of kneading the forming raw material to form the kneaded material, and an example of the method is a method using a kneader, a vacuum clay kneader or the like.

Next, the kneaded material is extrusion-formed to prepare the honeycomb formed body. During the extrusion-forming, it is preferable to use the die having desirable entire shape, cell shape, partition wall thickness, cell density and the like. As a material of the die, a hard metal which does not easily wear down is preferable. The honeycomb formed body is a structure having partition walls to define and form a plurality of cells which become through channels for a fluid and an outer peripheral wall positioned in the most outer periphery.

A partition wall thickness, a cell density, an outer peripheral wall thickness and the like of the honeycomb formed body can suitably be determined in accordance with a structure of the honeycomb structure of the present invention to be prepared, in consideration of shrinkages in the drying and the firing.

Next, the obtained honeycomb formed body is preferably dried. The dried honeycomb formed body will be referred to as "a dried honeycomb body" sometimes. There is not any special restriction on a drying method, and examples of the method include electromagnetic heating systems such as microwave heating drying and high frequency dielectric heating drying, and external heating systems such as hot air drying and superheat steam drying. Among these methods, it is preferable that a predetermined amount of a water content is dried by the electromagnetic heating system and then the remaining water content is dried by the external heating system, because the whole formed body can immediately and evenly be dried so that cracks are not generated. As drying conditions, it is preferable that the water content of 30 to 99 mass % to the amount of the water content prior to the drying is removed by the electromagnetic heating system and then the water content is decreased to 3 mass % or less by the external heating system. As the electromagnetic heating system, dielectric heating drying is preferable, and as the external heating system, the hot air drying is preferable.

When a length of the honeycomb formed body (the dried honeycomb body) in the central axis direction is not a desirable length, both end surfaces (both end portions) of the honeycomb formed body are preferably cut to obtain the desirable length. There is not any special restriction on a cutting method, but an example of the method is a method using a round saw cutter or the like.

Next, an electrode member forming raw material to form electrode members is blended. When main components of the electrode members are silicon carbide and metal silicon, the electrode member forming raw material is preferably formed by adding predetermined additives to silicon carbide powder and metal silicon powder, followed by the kneading.

Specifically, metal silicon powder (metal silicon), a binder, a surfactant, a pore former, water and the like are added to silicon carbide powder (silicon carbide) and kneaded to prepare the electrode member forming raw material. When a total mass of the silicon carbide powder and metal silicon is 100 parts by mass, the mass of metal silicon is preferably from 20 to 40 parts by mass. An average particle diameter of silicon carbide particles in the silicon carbide powder is preferably from 10 to 60 µm. An average particle diameter of the metal silicon powder (metal silicon) is preferably from 2 to 20 µm. When the average particle diameter is smaller than 2 µm, the electrical resistivity is excessively small sometimes. When the average particle diameter is larger than 20 µm, the electrical resistivity is excessively large sometimes. The average particle diameters of the silicon carbide particles and metal silicon (metal silicon particles) are values measured by the laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when a total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as pores are formed after the firing, and examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, and hence strength deterioration occurs sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like electrode member forming raw material. There is not any special restriction on a kneading method and, for example, a vertical stirrer can be used.

Next, the obtained electrode member forming raw material is preferably applied to a side surface of the dried honeycomb formed body (the dried honeycomb body). There is not any special restriction on a method of applying the electrode member forming raw material to the side surface of the dried honeycomb body but, for example, a printing method can be used. Furthermore, the electrode member forming raw material is preferably applied to the side surface of the dried honeycomb body so as to obtain the above-mentioned shape of the electrode members in the honeycomb structure of the present invention. A thickness of each electrode member can be set to a desirable thickness by regulating a thickness of the electrode member forming raw material during the application thereof. As described above, the electrode members can be formed simply by applying the electrode member forming raw material to the side surface of the dried honeycomb body, followed by the drying and the firing, and hence the electrode members can very easily be formed.

Next, the electrode member forming raw material applied to the side surface of the dried honeycomb body is preferably dried to prepare "the dried honeycomb body with the electrode member raw material". A drying temperature as a drying condition is preferably from 50 to 100° C.

Next, a slit is preferably formed in the dried honeycomb body with the electrode member raw material. The slit is preferably formed by using a router or the like. The slit is formed to open in a side surface of the dried honeycomb body with the electrode member raw material. Furthermore, at least one slit is preferably formed to open in a region to which the electrode member raw material is applied. Furthermore, at least another slit is preferably formed to open in a region where the side surface of the dried honeycomb body is exposed without applying the electrode member raw material. The slit to be formed in the dried honeycomb body with the electrode member raw material is preferably a slit similar to the above-mentioned preferable configuration of the slit formed in the honeycomb structure of the present invention. For example, in the dried honeycomb body with the electrode member raw material, the slits similar to the slits 6 formed in the honeycomb structure 100 shown in FIG. 1 are preferably formed. It is to be noted that the slits may be formed after the dried honeycomb body with the electrode member raw material is fired. Furthermore, the electrode member forming raw material may be applied to the dried honeycomb body after the slits are formed in the dried honeycomb body.

Next, the dried honeycomb body with the electrode member raw material is preferably fired to prepare the honeycomb structure. It is to be noted that prior to the firing, calcinating is preferably performed to remove the binder and the like. The calcinating is preferably performed at 400 to 500° C. in the air atmosphere for 0.5 to 20 hours.

As firing (main firing) conditions, heating is preferably performed at 1400 to 1500° C. in an inert atmosphere of nitrogen, argon or the like for one to 20 hours. Furthermore, after the firing, for enhancement of a durability, an oxygenation treatment is preferably performed at 1200 to 1350° C. for one to ten hours. There is not any special restriction on a calcinating and firing method, and the firing can be performed by using an electric furnace, a gas furnace or the like.

Next, a manufacturing method of another embodiment of the honeycomb structure of the present invention will be described. The manufacturing method of the honeycomb structure of the present embodiment is a manufacturing method of a honeycomb structure in which a filling material is filled into slits (which includes the filling material). For example, such a honeycomb structure as shown in FIG. 1 is prepared by this method.

In the manufacturing method of the honeycomb structure of the present embodiment, first, "a dried honeycomb body with an electrode member raw material" is preferably prepared by a method similar to the above-mentioned one embodiment of the manufacturing method of the honeycomb structure of the present invention.

When the same material as in electrode members is used as a filling material, slits are preferably formed in the dried honeycomb body with the electrode member raw material similarly to the above-mentioned one embodiment of the manufacturing method of the honeycomb structure of the present invention, after "the dried honeycomb body with the electrode member raw material" is prepared. Then, a raw material for the filling material is preferably prepared. The raw material for the filling material preferably has a composition similar to a preferable composition of an electrode member forming raw material. Next, the raw material for the filling material is preferably filled into the slits. When the raw material for the filling material is filled into the slits, a spatula or the like is preferably used. Next, it is preferable to dry the dried honeycomb body with the electrode member raw material in which the raw material for the filling material is filled into the slits. A drying temperature as a drying condition is preferably from 50 to 100° C. Next, the dried honeycomb body with the electrode member raw material after the drying is preferably fired, to obtain the honeycomb structure. Firing conditions are preferably similar to the preferable firing conditions in the above-mentioned one embodiment of the manufacturing method of the honeycomb structure of the present invention.

When a material which requires a heat treatment at a temperature lower than a firing temperature of the electrode member is used as the filling material, calcinating and main firing are preferably performed after "the dried honeycomb body with the electrode member raw material" is prepared, to obtain "a fired honeycomb body with electrode members". Furthermore, slits are then preferably formed in the fired honeycomb body with the electrode members. Respective conditions of the calcinating, main firing and slit formation are preferably similar to those of the above-mentioned one embodiment of the manufacturing method of the honeycomb structure of the present invention. Then, the raw material for the filling material is preferably filled into the fired honeycomb body with the electrode members in which the slits are formed, followed by the drying and the heat treatment, to obtain the honeycomb structure. When the raw material for the filling material is filled into the slits, a spatula or the like is preferably used. The raw material for the filling material preferably contains inorganic particles and an inorganic adhesive. The raw material for the filling material preferably further contains an organic binder, a surfactant, resin balloons, water and the like. Examples of the inorganic particles include plate-like particles, spherical particles, block-like particles, fibrous particles, and needle-like particles. Furthermore, examples of a material of the inorganic particles include silicon carbide, mica, talc, boron nitride, and glass flakes. The inorganic particles may be a mixture of a plurality of types of inorganic particles. Furthermore, the inorganic particles contains 20 mass % or more of at least silicon carbide particles. Examples of the inorganic adhesive include colloidal silica ($SiO_2$ sol), colloidal alumina (alumina sol), various oxide sols, ethyl silicate, water glass, silica polymer, and aluminum phosphate.

EXAMPLES

Hereinafter, examples of the present invention will further specifically be described, but the present invention is not limited to these examples.

Example 1

Silicon carbide (SiC) powder and metal silicon (Si) powder were mixed at a mass ratio of 80:20 to prepare a silicon carbide-metal silicon mixture. Then, to the silicon carbide-metal silicon mixture, hydroxypropyl methylcellulose as a binder and a water-absorbing resin as a pore former were added, and water was also added to prepare a forming raw material. Then, the forming raw material was kneaded by a vacuum clay kneader to prepare a columnar kneaded material. A content of the binder was 7 parts by mass when a total of the silicon carbide (SiC) powder and the metal silicon (Si) powder was 100 parts by mass. A content of the pore former was 3 parts by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 20 μm, and an average particle diameter of the metal silicon powder was 6 μm. Furthermore, an average particle diameter of the pore former was 20 μm. The average particle diameters of silicon carbide, metal silicon and the pore former are values measured by a laser diffraction method.

The obtained columnar kneaded material was extruded by using an extrusion-forming machine, to obtain a honeycomb formed body. The obtained honeycomb formed body was dried by high frequency dielectric heating, and then dried at 120° C. for two hours by use of a hot air drier, and both end surfaces of the honeycomb formed body were cut as much as a predetermined amount.

Next, silicon carbide (SiC) powder and metal silicon (Si) powder were mixed at a mass ratio of 60:40, and to this mixture, hydroxypropyl methylcellulose as a binder, glycerin as a moisture retaining agent and a surfactant as a dispersant were added, and water was also added, followed by the mixing. The mixture was kneaded to prepare an electrode member forming raw material. A content of the binder was 0.5 part by mass when the total of the silicon carbide (SiC) powder and the metal silicon (Si) powder was 100 parts by mass. A content of glycerin was 10 parts by mass when the total of the silicon carbide (SiC) powder and the metal silicon (Si) powder was 100 parts by mass. A content of the surfactant was 0.3 part by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 52 μm, and an average particle diameter of the metal silicon powder was 6 μm. The average particle diameters of silicon carbide and metal silicon are values measured by the laser diffraction method. The kneading was performed by using a vertical stirrer.

Next, the electrode member forming raw material was applied to the side surface of the dried honeycomb formed body in such a band-like manner as to extend between both end portions (between both end surfaces) of the honeycomb formed body so that a thickness was 1.5 mm and "an angle of 0.5 times a central angle in a cross section perpendicular to a cell extending direction was 50°". The electrode member forming raw materials were applied to two portions of the side surface of the dried honeycomb formed body. Then, in the cross section perpendicular to the cell extending direction, one of the two portions to which the electrode member forming raw materials were applied was disposed on a side opposite to the other portion via a center of the honeycomb formed body.

Next, the electrode member forming raw material applied to the honeycomb formed body was dried, to obtain a dried honeycomb body with an electrode member raw material. A drying condition was 70° C.

Figure 7:
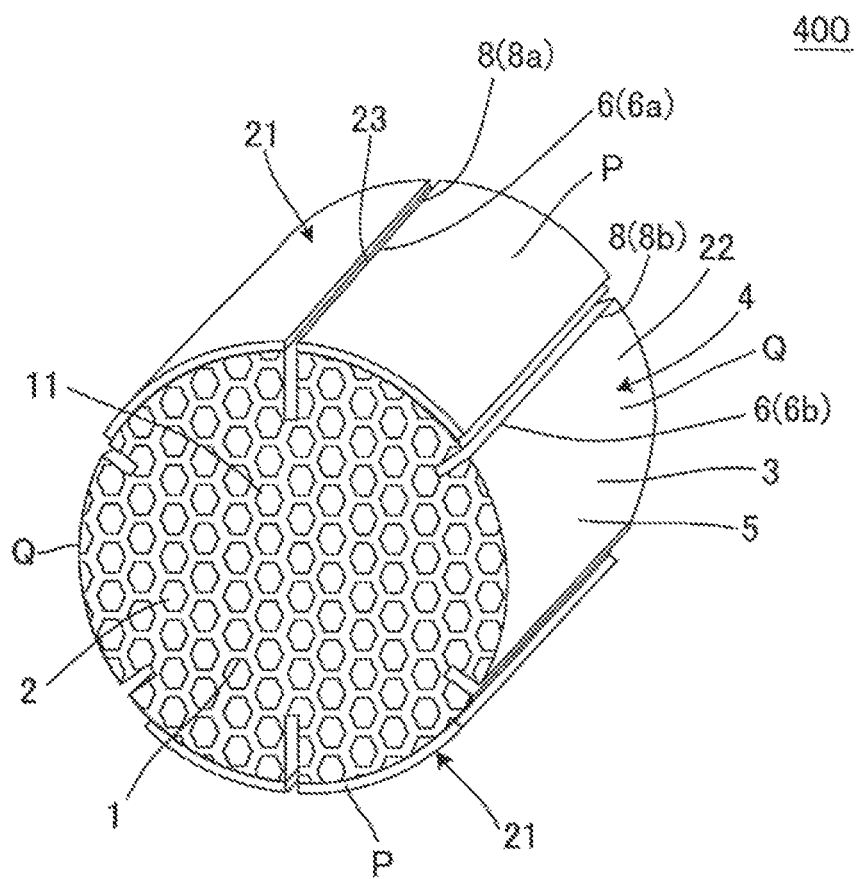
FIG. 7 is a perspective view schematically showing a honeycomb structure (a slit structure A) of Example 1.

Next, in the dried honeycomb body with the electrode member raw material, six slits were formed in the same manner as in slits 6 (6a and 6b) of a honeycomb structure 400 shown in FIG. 7. The slits were formed by using a router.

Next, the dried honeycomb body with the electrode member raw material in which the slits were formed was degreased, fired and further subjected to an oxidation treatment to obtain a honeycomb structure. Degreasing conditions were 550° C. and three hours. Firing conditions were an argon atmosphere, 1450° C. and two hours. Conditions of the oxidation treatment were 1300° C. and one hour.

In the obtained honeycomb structure, as in the honeycomb structure 400 shown in FIG. 7, one slit was formed in a central portion of each of two electrode member regions P, two slits were formed in each of two honeycomb structure body regions Q, and hence the six slits 6 in total were formed. A slit depth was 5 mm. A slit width was 1 mm. Electrode member slit open frontal areas were formed to extend in the cell extending direction. Honeycomb structure body slit open frontal areas were formed to extend in the cell extending direction. FIG. 7 is a perspective view schematically showing the honeycomb structure 400 of Example 1 (a slit structure A).

An average pore diameter (pore diameters) of partition walls of the obtained honeycomb structure was 8.6 μm, and a porosity was 45%. The average pore diameter and the porosity are values measured by a mercury porosimeter. Furthermore, the honeycomb structure had a partition wall thickness of 90 μm and a cell density of 90 cells/cm². Furthermore, a bottom surface of the honeycomb structure had a round shape with a diameter (an outer diameter) of 93 mm, and a length of the honeycomb structure in the cell extending direction was 100 mm. Furthermore, an angle of 0.5 times a central angle of each of two electrode members in the cross section of the honeycomb structure which was perpendicular to the cell extending direction was 50°. Furthermore, a thickness of each of the two electrode members was 1.5 mm. Furthermore, an electrical resistivity of the electrode members was 1.3 Slam, and an electrical resistivity of a honeycomb structure body was 100 Ωcm. Furthermore, a cell shape in the cross section of the honeycomb structure which was perpendicular to the cell extending direction was a hexagonal shape.

As to the obtained honeycomb structure, "a heat shock resisting property test" was carried out by a method described in the following. The results are shown in Table 1.

Additionally, the electrical resistivities of the honeycomb structure body and the electrode members were measured by the following method. A test piece of 10 mm×10 mm×50 mm was prepared by using the same material as in each measurement object. That is, when the electrical resistivity of the honeycomb structure body is measured, the test piece is prepared by using the same material as in the honeycomb structure body, and when the electrical resistivity of each electrode member is measured, the test piece is prepared by using the same material as in the electrode member. A silver paste was applied to the whole surfaces of both end portions of the test piece, so that it was possible to energize the test piece via a wiring line. The test piece was connected to a voltage applying current measuring device. A thermocouple was disposed in a central region of the test piece. A voltage was applied to the test piece, and a change of a temperature of the test piece with an elapse of time during the application of the voltage was confirmed by a recorder. Further specifically, a voltage of 100 to 200 V was applied, a current value and a voltage value were measured in a state where the test piece temperature was 400° C., and the electrical resistivity was calculated from the obtained current value and voltage value and the test piece dimension.

(Heat Shock Resisting Property Test)

A heating cooling test of the honeycomb structure was carried out by using "a propane gas burner testing machine including a metal case in which the honeycomb structure was contained, and a propane gas burner capable of supplying a heating gas into the metal case". The above heating gas was a burning gas generated when burning a propane gas by the gas burner (the propane gas burner). Then, by the above heating cooling test, it was confirmed whether cracks were generated in the honeycomb structure, to evaluate heat shock resisting properties. Specifically, the obtained honeycomb structure was contained (canned) in the metal case of the propane gas burner testing machine. Then, the gas (the burning gas) heated by the propane gas burner was supplied into the metal case, so that the gas passed through the honeycomb structure. Temperature conditions (inlet gas temperature conditions) of the heating gas flowing into the metal case were as follows. First, a temperature was raised to a specified temperature in five minutes, the specified temperature was held for ten minutes, the temperature was cooled down to 100° C. in five minutes, and then the temperature of 100° C. was held for ten minutes. Such a series of operations of the temperature raising, the cooling and the holding will be referred to as "the temperature raising and cooling operation". Afterward, cracks of the honeycomb structure were confirmed. Then, the above "temperature raising and cooling operation" was repeated while raising the specified temperature from 825° C. every 25° C. The specified temperature was set to 14 stages from 825° C. every 25° C. That is, the above "temperature raising and cooling operation" is carried out until the specified temperature reaches 1150° C. When the specified temperature is high, a temperature rising rapidness is large, and when the temperature rising of an outer peripheral portion delays behind a central portion, a temperature difference between the central portion and the outer peripheral portion enlarges, and hence generation stress is large. In Table 1, a column of "the heat shock resisting property test" indicates the specified temperature when the cracks were generated in the honeycomb structure in the heat shock resisting property test.

TABLE 1

| | Outer dia. of honeycomb structure body | Presence/ absence of slit | Presence/ absence of filling material | Slit structure | Electrode member slit Slit depth mm | Electrode member slit Slit width mm | Honeycomb structure body Slit 1 Slit depth mm | Honeycomb structure body Slit 1 Slit width mm | Honeycomb structure body Slit 2 Slit depth mm | Honeycomb structure body Slit 2 Slit width mm | Young's modulus of filling material GPa | Porosity of filling material % | Heat shock resisting property test |
|---|---|---|---|---|---|---|---|---|---|---|---|---|---|
| Example 1 | 93 | Present | Absent | A | 5 | 1 | 3 | 1 | — | — | — | — | 1075 |
| Example 2 | 93 | Present | Absent | A | 7 | 1 | 3 | 1 | — | — | — | — | 1100 |
| Example 3 | 93 | Present | Absent | A | 7 | 1 | 5 | 1 | — | — | — | — | 1125 |
| Example 4 | 93 | Present | Present | A | 5 | 1 | 3 | 1 | — | — | 0.1 | 80 | 975 |
| Example 5 | 93 | Present | Present | A | 5 | 1 | 3 | 1 | — | — | 0.5 | 65 | 975 |
| Example 6 | 93 | Present | Present | A | 5 | 1 | 3 | 1 | — | — | 5 | 55 | 950 |
| Example 7 | 93 | Present | Present | A | 5 | 1 | 3 | 1 | — | — | 15 | 52 | 925 |
| Comparative Example 1 | 93 | Present | Absent | A | 3 | 1 | 3 | 1 | — | — | — | — | 1050 |
| Comparative Example 2 | 93 | Present | Absent | A | 5 | 1 | 5 | 1 | — | — | — | — | 1100 |
| Comparative Example 3 | 93 | Present | Present | A | 3 | 1 | 3 | 1 | — | — | 0.1 | 80 | 950 |
| Example 8 | 93 | Present | Absent | B | 5 | 1 | 3 | 1 | 1 | 1 | — | — | 1100 |
| Example 9 | 93 | Present | Absent | B | 5 | 1 | 3 | 1 | 3 | 1 | — | — | 1125 |
| Example 10 | 93 | Present | Absent | B | 7 | 1 | 3 | 1 | 1 | 1 | — | — | 1150 |
| Example 11 | 93 | Present | Absent | B | 5 | 1 | 7 | 1 | 1 | 1 | — | — | 1050 |
| Example 12 | 93 | Present | Absent | B | 5 | 1 | 7 | 1 | 3 | 1 | — | — | 1075 |
| Comparative Example 4 | 93 | Present | Absent | B | 3 | 1 | 3 | 1 | 3 | 1 | — | — | 1075 |
| Comparative Example 5 | 93 | Present | Absent | B | 5 | 1 | 5 | 1 | 5 | 1 | — | — | 1125 |
| Comparative Example 6 | 93 | Absent | Absent | — | — | — | — | — | — | — | — | — | 825 |

Examples 2 to 12 and Comparative Examples 1 to 6

The procedures of Example 1 were repeated except that respective conditions were changed as shown in Table 1, to prepare honeycomb structures. In the same manner as in Example 1, "a heat shock resisting property test" was carried out. The results are shown in Table 1.

In the honeycomb structures of Examples 4 to 7, a filling material was filled into the whole space of each of all slits. A filling method of the filling material was as follows. "A dried honeycomb body with an electrode member raw material in which the slits were formed" was prepared in the same manner as in Example 1. Then, a raw material for the filling material was filled into "the dried honeycomb body with the electrode member raw material in which the slits were formed" by use of a spatula, to obtain "the dried honeycomb body with the raw material for the filling material". Afterward, "the dried honeycomb body with the raw material for the filling material" was dried at 70° C., and then degreased and fired in the same manner as in Example 1, to obtain the honeycomb structure. A composition of the raw material for the filling material was the same as that of an electrode member forming raw material.

Figure 8:
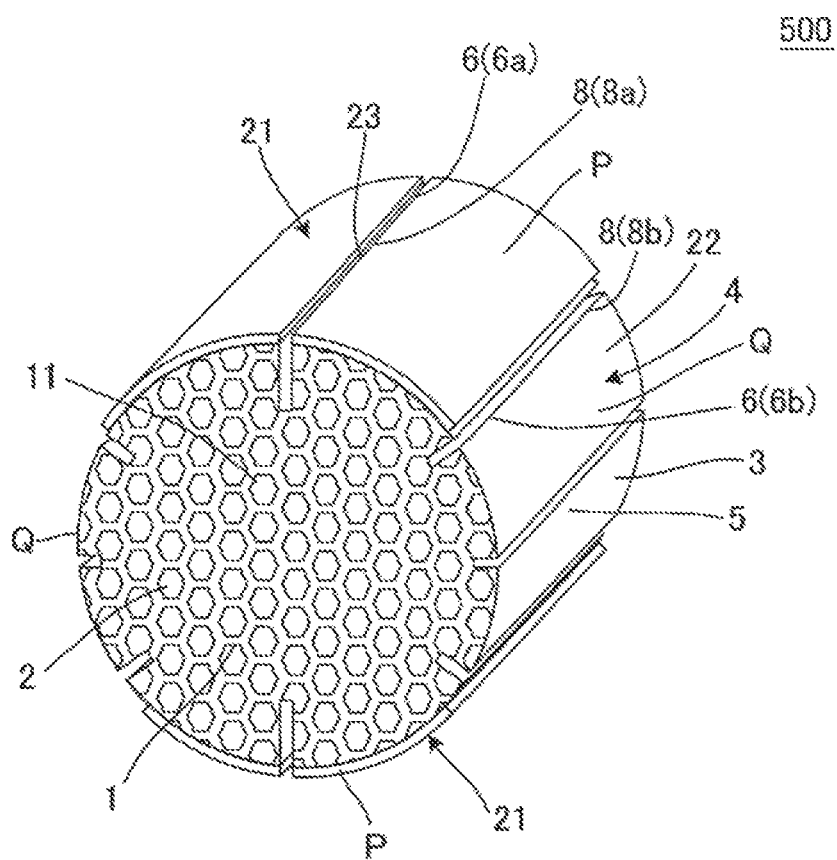
FIG. 8 is a perspective view schematically showing a honeycomb structure (a slit structure B) of Example 8.

In Table 1, "A" in a column of "a slit structure" (a slit structure A) means an arrangement (a structure) of the slits formed in the honeycomb structure 400 shown in FIG. 7. "B" in the column of "the slit structure" (a slit structure B) means an arrangement (a structure) of slits formed in a honeycomb structure 500 shown in FIG. 8. In the honeycomb structure 500 shown in FIG. 8, one slit was formed in a central portion of each of two electrode member regions P, and three slits were formed in each of two honeycomb structure body regions Q, so that eight slits 6 in total were formed. FIG. 8 is a perspective view schematically showing the honeycomb structure (the slit structure B) of Example 8.

In Table 1, "a honeycomb structure body slit 1" is a slit formed in the vicinity of a boundary with an electrode member among honeycomb structure body slits. The honeycomb structure body slit formed in the honeycomb structure 400 shown in FIG. 7 is "the honeycomb structure body slit 1". Furthermore, "a honeycomb structure body slit 2" is a slit formed in "a central portion" of a honeycomb structure body region "in an outer peripheral direction" among honeycomb structure body slits. In the honeycomb structure 500 shown in FIG. 8, two "honeycomb structure body slits 1" and one "honeycomb structure body slit 2" are formed in each of the two honeycomb structure body regions.

"The Young's modulus of the filling material" is a value measured in conformity to JIS R1602 by a bending resonance method. A rod-like test piece of 3 mm×4 mm×40 mm was prepared by using a raw material to form the filling material, and the Young's modulus was measured by using the test piece. Furthermore, a filling material porosity is a value measured by a mercury porosimeter.

It is seen from Table 1 that the honeycomb structure in which "a depth of at least one electrode member slit is larger than a depth of at least one honeycomb structure body slit" has excellent heat shock resisting properties. For example, Example 1 and Comparative Example 1 have the same depth of the honeycomb structure body slits, and the depth of each electrode member slit in Example 1 is larger. As a result, the honeycomb structure of Example 1 has more suitable heat shock resisting properties.

A honeycomb structure of the present invention can suitably be utilized as a catalyst carrier for an exhaust gas purification device which purifies an exhaust gas of a car or the like.

DESCRIPTION OF REFERENCE SYMBOLS

1: partition wall, 2: cell, 3: outer peripheral wall, 4: honeycomb structure body, 5: side surface, 6: slit, 6*a*:

electrode member slit, 6b: honeycomb structure body slit, 7: filling material, 8: open frontal area, 8a: electrode member slit open frontal area, 8b: honeycomb structure body slit open frontal area, 11: one end surface, 12: the other end surface, 21: electrode member, 22: outer periphery, 23: electrode central portion, 24: honeycomb central portion, 31: end surface slit, 100, 200, 300, 400 and 500: honeycomb structure, P: electrode member region, Q: honeycomb structure body region, D1: depth of the electrode member slit, D2: depth of honeycomb structure body slit, O: center, C: central portion (of the electrode member), L1 and L2: line segment, α: central angle, β: angle, and θ: angle of 0.5 times the central angle.

What is claimed is:

1. A honeycomb structure comprising:
a tubular honeycomb structure body having porous partition walls to define and form a plurality of cells which become through channels for a fluid and extend from one end surface to the other end surface, and an outer peripheral wall positioned in the most outer periphery; and a pair of electrode members disposed on a side surface of the honeycomb structure body,
wherein an electrical resistivity of the honeycomb structure body is from 1 to 200 Ωcm,
each of the pair of electrode members is formed into a band-like shape extending in an extending direction of the cells of the honeycomb structure body, and
in a cross section perpendicular to the cell extending direction, one electrode member in the pair of electrode members is disposed on a side opposite to the other electrode member in the pair of electrode members via a center of the honeycomb structure body,
the honeycomb structure having an outer periphery constituted of electrode member regions as regions where the electrode members are disposed, and honeycomb structure body regions as regions where the side surface of the honeycomb structure body is exposed,
wherein there are formed one or more electrode member slits as slits opened in the electrode member region, there are formed one or more honeycomb structure body slits as slits opened in the honeycomb structure body region,
an electrode member slit open frontal area as a portion of the electrode member slit opened in the electrode member region is formed to extend in the cell extending direction, a honeycomb structure body slit open frontal area as a portion of the honeycomb structure body slit opened in the honeycomb structure body region is formed to extend in the cell extending direction, and
in the cross section perpendicular to the cell extending direction, a length of at least one of the electrode member slits is longer than that of at least one of the honeycomb structure body slits.

2. The honeycomb structure according to claim 1,
wherein in the cross section perpendicular to the cell extending direction,
lengths of all the electrode member slits are longer than those of all the honeycomb structure body slits, the electrode member slit having the electrode member slit open frontal area at a position closer to a central portion of the electrode member region has a longer length, and the honeycomb structure body slit having the honeycomb structure body slit open frontal area at a position closer to a central portion of the honeycomb structure body region has a shorter length.

3. The honeycomb structure according to claim 1,
having the electrode member slit in which the electrode member slit open frontal area is formed in a central portion of the electrode member region in an outer peripheral direction, and
having the honeycomb structure body slit in which the honeycomb structure body slit open frontal area is formed in a central portion of the honeycomb structure body region in the outer peripheral direction.

4. The honeycomb structure according to claim 2,
having the electrode member slit in which the electrode member slit open frontal area is formed in a central portion of the electrode member region in an outer peripheral direction, and
having the honeycomb structure body slit in which the honeycomb structure body slit open frontal area is formed in a central portion of the honeycomb structure body region in the outer peripheral direction.

5. The honeycomb structure according to claim 1,
wherein at least one of the electrode member slit and the honeycomb structure body slit is formed so that the slit does not intersect a straight line connecting central portions of the pair of electrode members to each other in the cross section perpendicular to the cell extending direction.

6. The honeycomb structure according to claim 2,
wherein at least one of the electrode member slit and the honeycomb structure body slit is formed so that the slit does not intersect a straight line connecting central portions of the pair of electrode members to each other in the cross section perpendicular to the cell extending direction.

7. The honeycomb structure according to claim 3,
wherein at least one of the electrode member slit and the honeycomb structure body slit is formed so that the slit does not intersect a straight line connecting central portions of the pair of electrode members to each other in the cross section perpendicular to the cell extending direction.

8. The honeycomb structure according to claim 4,
wherein at least one of the electrode member slit and the honeycomb structure body slit is formed so that the slit does not intersect a straight line connecting central portions of the pair of electrode members to each other in the cross section perpendicular to the cell extending direction.

9. The honeycomb structure according to claim 1,
wherein in the cross section perpendicular to the cell extending direction, the length of the slit is a length of 1 to 80% of a radius of the honeycomb structure body.

10. The honeycomb structure according to claim 1,
wherein a length of each of the electrode member slit open frontal area and the honeycomb structure body slit open frontal area in an outer peripheral direction is a length of 0.3 to 5.0% of a length of an outer periphery of the honeycomb structure body.

11. The honeycomb structure according to claim 1,
wherein the electrode member slit is formed in parallel with a straight line connecting central portions of the pair of electrode members to each other in the cross section perpendicular to the cell extending direction.

12. The honeycomb structure according to claim 1,
wherein the number of the slits is from 1 to 20.

13. The honeycomb structure according to claim 1,
having a filling material to be filled into the at least one slit, wherein the filling material is filled into at least a part of a space of the slit.

14. The honeycomb structure according to claim 13, wherein the filling material is filled into the whole space of the slit.

15. The honeycomb structure according to claim 13, wherein a Young's modulus of the filling material is from 0.001 to 20 GPa.

16. The honeycomb structure according to claim 13, wherein a porosity of the filling material is from 40 to 80%.

17. The honeycomb structure according to claim 13, wherein an electrical resistivity of the filling material is from 100 to 100000% of the electrical resistivity of the honeycomb structure body.

* * * * *